US008562313B2

(12) United States Patent  (10) Patent No.: US 8,562,313 B2
Andersen et al.  (45) Date of Patent: Oct. 22, 2013

(54) PUMP ASSEMBLY

(75) Inventors: Lars Kannegaard Andersen, Randers (DK); Steen Mikkelsen, Bjerringbro (DK); Brian Lundsted Poulsen, Langå (DK)

(73) Assignee: Grundfos Management a/s, Bjerringbro (DK)

( * ) Notice: Subject to any disclaimer, the term of this patent is extended or adjusted under 35 U.S.C. 154(b) by 320 days.

(21) Appl. No.: 12/523,344

(22) PCT Filed: Dec. 20, 2007

(86) PCT No.: PCT/EP2007/011253
§ 371 (c)(1),
(2), (4) Date: Jul. 16, 2009

(87) PCT Pub. No.: WO2008/086879
PCT Pub. Date: Jul. 24, 2008

(65) Prior Publication Data
US 2010/0111729 A1  May 6, 2010

(30) Foreign Application Priority Data

Jan. 18, 2007  (EP) .................................... 07000971

(51) Int. Cl.
*F04B 17/00* (2006.01)
(52) U.S. Cl.
USPC .............. 417/423.7; 417/423.14; 417/423.11; 310/89; 310/71; 310/43; 310/216.113; 310/216.137; 29/596
(58) Field of Classification Search
USPC ............. 417/410.1, 423.1, 423.14, 63, 423.7; 310/89, 71, 43, 216.113, 216.137, 45; 29/596

IPC ................................ H02K 15/02,15/08, 15/085
See application file for complete search history.

(56) References Cited

U.S. PATENT DOCUMENTS

| 3,867,658 | A | | 2/1975 | Dochterman |
| 5,049,770 | A | | 9/1991 | Gaeth et al. |
| 5,939,813 | A | * | 8/1999 | Schob ........................... 310/425 |
| 6,065,946 | A | * | 5/2000 | Lathrop .................... 417/423.14 |
| 6,075,304 | A | * | 6/2000 | Nakatsuka ............. 310/216.137 |
| 6,407,472 | B1 | * | 6/2002 | Takayanagi .................... 310/45 |
| 6,663,362 | B1 | * | 12/2003 | Lentz et al. ................. 417/423.7 |
| 6,896,494 | B2 | * | 5/2005 | Sunaga et al. ............. 417/423.1 |
| 7,187,094 | B1 | * | 3/2007 | Walker ............................ 310/71 |
| 2006/0082242 | A1 | * | 4/2006 | Schill ............................ 310/217 |
| 2007/0018521 | A1 | * | 1/2007 | Ishiguro et al. .......... 310/156.43 |

FOREIGN PATENT DOCUMENTS

| DE | 88 11 420 U1 | 1/1989 |
| EP | 0 467 041 A2 | 1/1992 |
| EP | 0 823 554 A1 | 2/1998 |
| FR | 2 865 983 A1 | 8/2005 |
| JP | 11284370 A * | 10/1999 |

* cited by examiner

*Primary Examiner* — Devon Kramer
*Assistant Examiner* — Thomas Fink
(74) *Attorney, Agent, or Firm* — Panitch Schwarze Belisario & Nadel LLP

(57) ABSTRACT

A pump assembly with an electric motor includes a stator having an iron core (16) and windings arranged thereon and being arranged in a stator housing surrounding the electric motor to the outside. The stator housing (6) is formed as a cast component, into which the iron core (16) is cast, and the windings have been deposited on the iron core (16) after the casting of the iron core (16) into the stator housing (6).

14 Claims, 10 Drawing Sheets

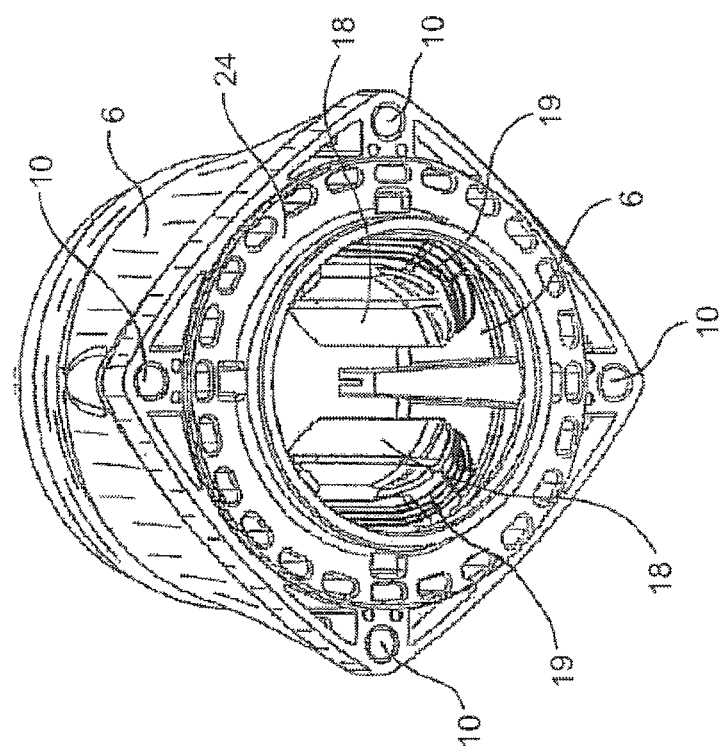
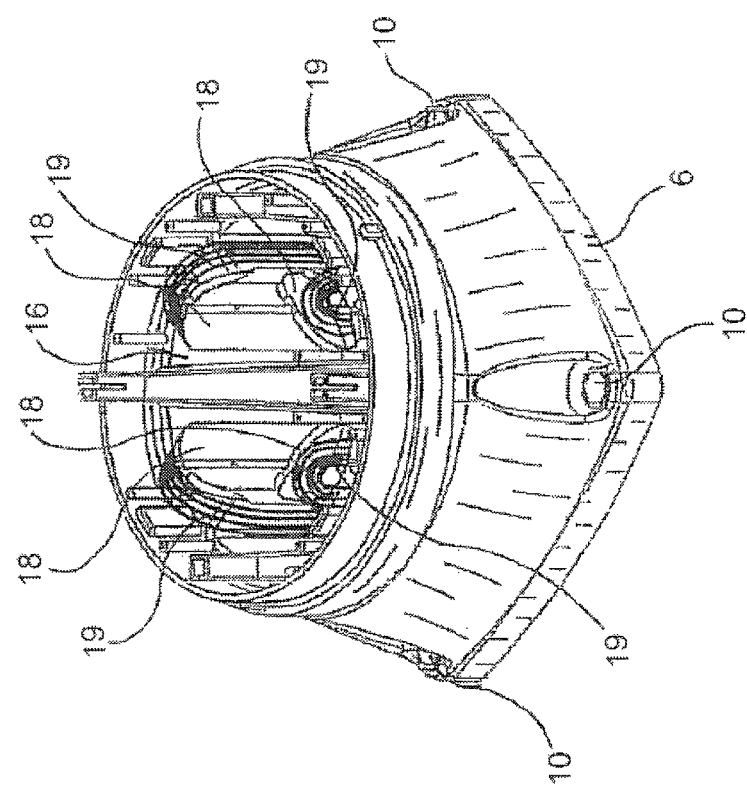
Fig. 5
Fig. 4

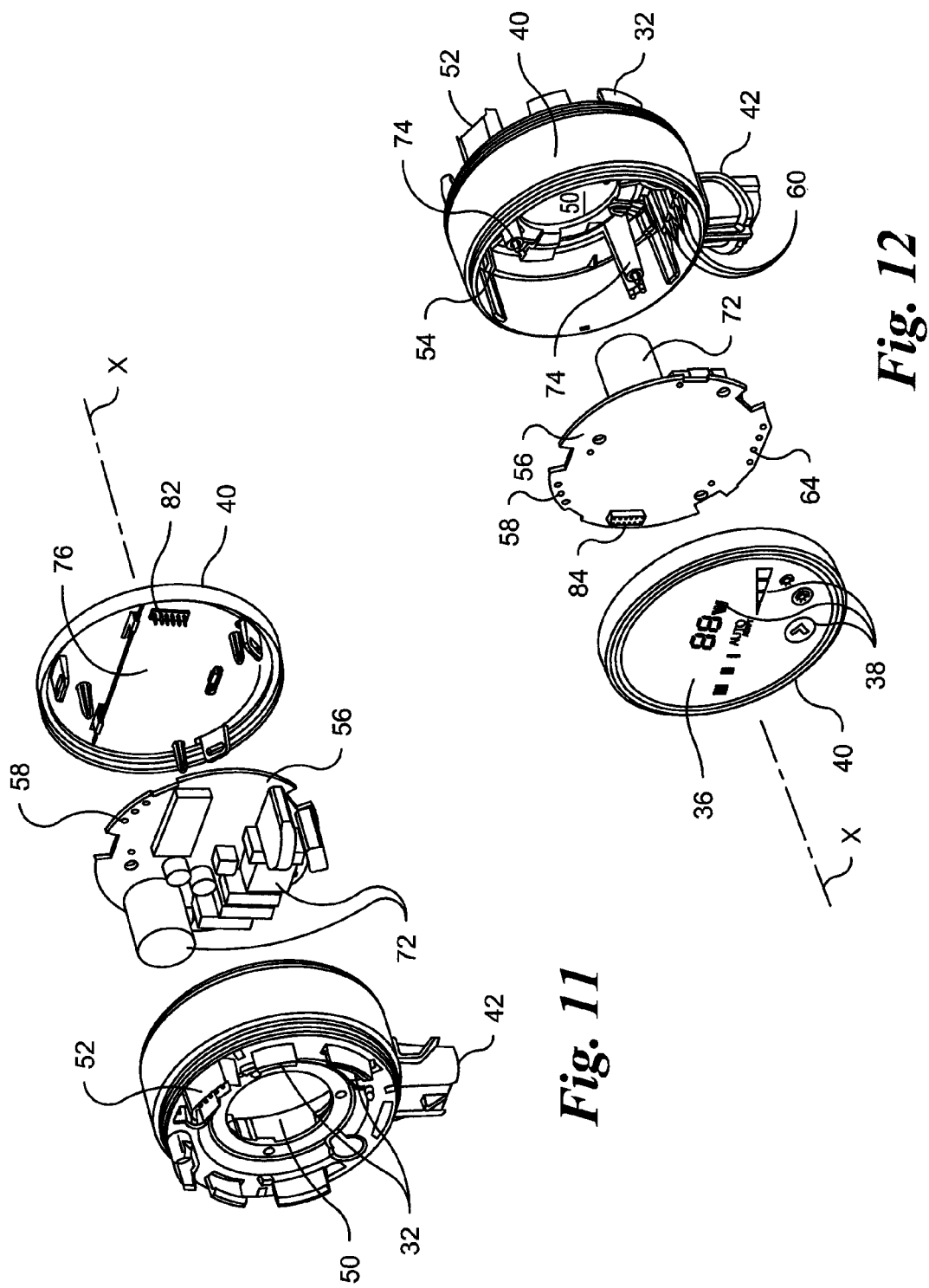

PUMP ASSEMBLY

CROSS-REFERENCE TO RELATED APPLICATIONS

This application is a Section 371 of International Application No. PCT/EP2007/011253, filed Dec. 20, 2007, which was published in the German language on Jul. 24, 2008, under International Publication No. WO 2008/086879 A1 and the disclosure of which is incorporated herein by reference.

BACKGROUND OF THE INVENTION

The invention relates to a pump assembly with an electric motor arranged in a stator housing.

Pump assemblies, in particular heating circulation pumps, are often constructed in a manner such that they consist of a pump housing and a stator housing, which are combined with one another. The electric motor, consisting of the stator and rotor rotatably mounted therein, is arranged in the stator housing. The stator comprises an iron core with coils or windings arranged thereon. The coils thereby are arranged on a winding carrier, which serves for insulation, on the iron core. The manufacture is effected with the known pump assemblies in a manner such that either ready-wound coils with the windings carriers are applied onto the iron core, or alternatively the coils are wound directly around the winding carrier already attached on the iron core. Subsequently, the iron core with the coils is inserted into the stator housing, wherein thereby a fixation in the stator housing must be created. Thus, with the known pump assemblies, a multitude of individual parts and assembly steps is required for the manufacture of the stator and arrangement in the stator housing. It is particularly the case with large-scale production that one wishes to reduce as much as possible the number of individual parts and the number of necessary assembly steps.

BRIEF SUMMARY OF THE INVENTION

With regard to this, it is the object of the invention to provide an improved pump assembly which permits an improved assembly of the stator.

This object is achieved by a pump assembly having an electric motor which comprises a stator with an iron core and windings arranged thereon and is arranged in a stator housing surrounding the electric motor to the outside, wherein the stator housing is designed as a cast component into which the iron core is cast, and the windings have been deposited onto the iron core after casting the iron core into the stator housing. The object is also achieved by a method of manufacturing a pump assembly, wherein on casting the stator housing, an iron core of the stator is cast into the stator housing, and the windings of the stator are not deposited onto the iron core until after the casting of the iron core into the stator housing.

The stator preferably comprises an iron core which may preferably be formed from a multitude of layered laminations, on which one or more windings are arranged, depending on the design of the electric motor. Thereby, the iron core may be designed of one piece or of several pieces, and surrounds a central circular free space, in which the rotor of the electric motor is arranged. Additionally, preferably a can may be arranged, which separates a fluid-filled rotor space from the stator, as is usual with wet-running electric motors. Furthermore, winding carriers are preferably arranged on an iron core, on which the windings are arranged and which electrically insulate the windings with respect to the iron core.

The stator and the stator housing are preferably designed in a manner such that the stator housing is manufactured as a cast component, into which the iron core is cast in a direct manner. Thereby, the iron core may be designed as a pre-manufactured component, for example of layered sheet metal laminations, which is applied into the tool on casting the stator housing, and then the material of the stator housing flows around it in part regions, so that a positive fit and/or material fit connection is created between the stator housing and the iron core. Thus, a one-part component, which fulfills the function of the stator housing and iron core, arises on casting the stator housing due to the simultaneous casting in of the iron core.

The stator is then preferably manufactured further in a manner such that the windings are arranged on the iron core only after casting-in or casting together the iron core and stator housing. That is, according to the invention, first the iron core is arranged in the stator housing, which is effected by the casting-in, and subsequently first the windings are inserted into the iron core or are deposited onto the iron core. Thus, according to the invention, the insertion of the iron core into the stator housing with the required fixation in the stator housing after arranging the windings is done away with. On account of the single part design of the stator housing and iron core, on casting the stator housing, the assembly of the stator and of the stator housing is significantly simplified. Furthermore, a permanent fixation of the iron core in the stator housing, which is simple to realize, is achieved.

Particularly preferably, the windings are wound around the iron core after casting the iron core into the stator housing. That is, the winding of the windings from one or more wires is effected not until in the inside of the stator housing, after the iron core is firmly arranged there by the casting-in. This has the advantage that after the winding, only an integral component consisting of the stator and stator housing exists, in which the coils or windings are arranged in a protected manner.

Preferably, the stator housing of plastic is manufactured as an injection molded part. The iron core may be easily cast into such an injection-molded part by applying the iron core into the tool before the casting of the injection molding part, and plastic may then flow around the iron core in the desired part regions on casting. A light but firm stator housing may be created from plastic.

Further preferably, a coil carrier is simultaneously formed on the iron core by casting the iron core into the stator housing. This particularly lends itself when the stator housing is manufactured of plastic, since the coil carrier should be designed in an electrically insulating manner. Thus, the coil carrier or the coil carriers may be simultaneously injection molded or cast with the stator housing, and connected to the iron core, by which the number of the individual parts and assembly steps may be considerably reduced.

The stator housing is preferably designed in a tubular manner with openings at the two axial ends, wherein the stator housing is connected to a pump housing at a first axial end side, and is closed by a lid or terminal box at an opposite second axial end side. The tubular design of the stator housing has the advantage that the stator housing with the iron core firmly connected therein, is accessible from both ends on incorporating the winding or the windings in the inside of the stator housing, so that the introduction of the windings is simplified.

Preferably, fastening means are formed on the stator housing for the connection to the pump housing. These may for example be flange-like projections with through-holes, through which bolts or screws are guided, which create the connection to the pump housing. Preferably, corresponding fastening means are also provided for fastening the lid or the terminal box. Furthermore, seals may be provided between the lid and the stator housing and/or between the stator hosing and the pump housing, in order to seal the pump assembly and in particular the stator housing to the outside. For this, O-rings may be applied at the interfaces, or however seals may also be formed firmly connected to the stator housing and/or the lid or the pump housing. These seals, e.g. of a suitable material, may be cast or injected directly onto the corresponding housing part.

The tubular stator housing particularly preferably comprises a round and in particular circular cross section, so that in particular also the open ends have a round or circular cross section. This is advantageous for the sealing of the gap between the stator housing and lid, or between the stator housing and the pump housing, since a round or circular gap is easier to seal.

Further preferably, operating- and/or display elements are arranged on the lid and the terminal box on the axial side. The operating- and/or display elements are thus arranged on the outer surface of the lid or terminal box which is distant to the stator housing, and there, is easily accessible from the outside. Furthermore, a large plane surface is available, on which the operating- and/or display elements may be arranged in a clear manner.

Further preferably, the electric motor is designed as a wet-running electric motor with a can. Such electric motors are particularity preferred with heating circulation pumps.

The can is thereby preferably fixed in the axial and preferably also in the radial direction in the region of the axial end of the stator housing which faces a pump housing. It is important for the can to be held in the stator in a defined position, so that the rotor may rotate without hindrance in the inside of the can. Furthermore, the end of the rotor distant to the pump assembly is usually mounted at the axial end of the can, in this. Thus, the can must be fixed, in order to be able to accommodate the bearing forces of the rotor. Conventionally, for this, the can is fixed in the stator housing at the end which is distant to the pump assembly and on which the rotor mounting is also arranged. According to the invention, one now foregoes this fixation, and the can is only fixed at the end which faces the pump assembly. By this, more free space at the axial end of the stator housing distant to the pump assembly is created, which favors the assembly and arrangement of further components, for example the terminal box. Furthermore, one does not need to provide a receiver for the can in the stator housing at the axial end distant to the pump assembly, which would project into the inner cross section of the stator housing. This improves the accessibility of the iron core arranged in the stator housing, for incorporating the windings. For fixing the can on the stator side distanced to the pump housing, the can may particularly preferably be fixed with a non-positive and/or positive fit between the pump housing and the stator housing, so that simultaneously a fixation of the can may be achieved on connecting the stator and pump housing.

Preferably, the can at its axial end facing the pump housing comprises an outwardly projecting collar which is fixed, in particular clamped, between the pump housing and the stator housing. The collar ideally forms a radially outwardly extending, annular projection which is fixed in a corresponding receiver between the stator and the pump housing, in a manner such that the can is fixed with a non-positive and/or positive fit in the axial direction and preferably also in the radial direction.

Thereby, the can with its collar, may bear directly on a receiver region on the axial end of the stator housing or on an intermediate ring arranged in the inside of the stator housing at its axial end, in the axial and preferably also in the radial direction. The intermediate ring is inserted into the axial, end opening of the stator housing which faces the pump housing, and forms a bearing surface or receiver for the can. In particular, the intermediate ring forms a bearing surface in the axial direction. Further preferably, the intermediate ring is however designed such that it comprises a central opening which in its cross section or diameter, is dimensioned such that the can at its outer periphery may come to bear on the inner periphery of the opening of the intermediate ring, and the intermediate ring ensures a fixation of the can in the radial direction. The intermediate ring is fixed on the stator housing in the axial and preferably also in the radial direction. This may be effected with a non-positive fit, a positive fit, and/or with a material fit. Thereby, the arrangement of the intermediate ring has the advantage that the end opening of the stator housing which faces the pump housing may be completely open on introducing the windings into the stator housing, so that the iron core is also more easily accessible from this side. Only after introducing the windings may the intermediate ring which accommodates the can, be inserted. Alternatively, a component corresponding to the intermediate ring may be integrally formed on the stator housing as one piece, and form the receiver region for the can.

According to a further preferred embodiment of the invention, a terminal box is arranged on the stator housing at an axial end, the terminal box having a tubular housing part which is preferably designed in an open manner or has openings, at its two axial ends. Thereby, the tubular housing part is attached with a first axial end onto the axial end of the stator housing. The opposite second axial end of the tubular housing part is closed by at least one lid element, into which operating- and/or display elements are integrated. Furthermore, an electrical connection element is arranged on the tubular housing part on the outer periphery. That is, the connection element which is provided for the connection to an electrical connection lead or an electrical connection, forms an integral component with the housing part.

The lid element preferably covers the whole axial end of the tubular housing part, whereby a large surface is provided for the arrangement of the operating- and display elements. This axial end permits a well viewable and easily accessible arrangement of the operating- and display elements.

The described design of the terminal box consisting of a tubular housing part which is attached with one side onto the stator housing, and at the other side is closed by a lid element, in particular with the design open at both sides, as a whole permits a simple assembly, since the accessibility of the inner space of the terminal box is improved. Thus for example the assembly and arrangement of the components in the inside of the terminal box may be effected through the opening which is closed by the lid element. Thereby, the housing part may be configured such that after closure of the lid element, all components arranged in the inside are arranged there in a fixed manner, so that a pre-manufactured terminal box may be created, even if the second axial end is still designed in an open manner. The terminal box with this second, open end may be attached onto the stator housing, so that connection contacts for the connection of the stator coils may penetrate through the opening or openings on this axial end into the inside of the terminal box, i.e. into the inside of the tubular housing part, and there, may come into contact with electronic components in the inside of the terminal box.

By the fact that the connection element is integrally formed in a peripheral manner, and extends preferably in the radial direction, it does not inhibit the described assembly procedures of the terminal box. Furthermore, the electrical connection of the complete pump assembly on the peripheral side of the terminal box is easy to accomplish, even at a later stage. The end of the terminal box on which the operating- and display elements are arranged, is thereby not covered by the electrical connection, so that the operation of the pump assembly is not compromised. The connection element is particularly preferably integrally formed onto the tubular housing part in a direct manner, whereby the number of individual parts is reduced, and the assembly is simplified.

The connection element serves for the electrical connection of the pump assembly. The connection element may be preferably designed as an electrical connection plug, as a connection terminal or as a connection cable, which are arranged on the outer periphery of the tubular housing part, or extend outward from the peripheral wall at the peripheral side. Thereby, the connection element is integrally formed onto the tubular component, preferably in a direct manner, so that an additional assembly is not necessary. Thus, a connection terminal or a connection plug may be integrally formed on the housing wall together with this, in a direct manner. Furthermore, it is possible for example to cast a connection cable into the housing.

The tubular housing part is advantageously manufactured of plastic, and the connection element is integrally formed on the housing part, preferably as one piece. Thus the connection element may be manufactured in one working procedure with the complete tubular housing part, for example with injection molding, so that an extremely inexpensive manufacture is possible.

Further preferably, the connection element comprises electrical contacts which are cast into the plastic and extend into the inside of the tubular housing part. This permits the electrical contacts to be incorporated into the connection element on casting the tubular housing part with the connection element, so that further assembly procedures for arranging the electrical leads or contacts may be done away with. The electrical contacts, on casting the housing with the connection element, are applied into the tool, so that the metal parts are peripherally cast with the plastic in a direct manner. A sealing of the electrical contacts in the connection element is simultaneously achieved by this. That is, the electrical contacts extend through the housing wall of the terminal box from the outer side to the inner side; wherein the plastic of the housing wall sealingly bears with the metal parts of the electrical contacts in a direct manner. The electrical contacts of the connection element or their free ends in the inside of the tubular housing part are preferably designed such that they come into direct contact with electrical contacts on a circuit board to be arranged in the inside of the terminal box.

Preferably, one of the electrical contacts of the connection element is provided as an earth-ground (ground) contact, wherein its end lying in the inside of the tubular housing part is designed as a plug contact which is in electrically conductive engagement with a ground connection which is formed on the stator housing. The plug contact may, for example, be designed as a sheet metal strip which extends transversely to the joining direction of the stator housing and the terminal box, i.e. essentially normally to the longitudinal axis of the stator housing and which comprises an opening into which a connection pin on the stator housing may engage. Tongue-like spring elements are designed in the opening, preferably at the edge, which engage with the surface of the connection pin with a non-positive fit, and create an electrical contact. In this manner, on joining the terminal box and the stator housing, one may create a ground contact to the connection element in a very simple manner, without additional wiring or assembly steps being necessary. The contact is created quasi automatically on putting together the stator housing and terminal box.

Preferably, at least one connection plug, which is connected to at least one stator coil, is integrally formed on the tubular housing part on its end facing the stator housing. This connection plug too is preferably cast as one piece with the tubular housing part. Thus, in this region, the number of the individual parts and necessary assembly steps is reduced. Furthermore, on account of the design of the connection between the terminal box and the stator coil as a plug contact, the assembly of the terminal box and, in particular, the electrical connection of the electronic components in the inside of the terminal body to the stator coils is very simple, since this may be effected in a simple manner by sticking the terminal box onto the stator housing, wherein the connection plug on the tubular housing part with a corresponding plug or a corresponding coupling engages on the stator or the stator housing.

The connection plug preferably comprises electrical contacts, which are cast into the tubular housing part and extend into the inside of the tubular housing part. Thus, the electrical conductors or contacts in the connection plug are introduced into this straight away on molding or casting the tubular housing part and the connection plug, so that further assembly steps may be done away with. The electrical contacts which are provided on the connection plug for contact with the stator coils extend in the opposite direction as electrical leads, into the inside of the tubular housing part. There they are provided for the connection to a circuit board with electronic components for control and/or regulation of the electric motor. Preferably, the electrical contacts for this are designed in the inside of the tubular housing part, likewise as plug contacts, which engage with corresponding plug contacts or connection couplings on a circuit board. A very simple connection of a circuit board in the inside of the terminal box to the electrical connections of the stator coils is possible in this manner, since this is effected by the electrical contacts in the tubular housing part which are cast in.

Preferably, a circuit board with electrical and/or electronic components is arranged in the inside of the tubular housing part, wherein the circuit board extends essentially parallel to the axial ends of the tubular housing as well as of the stator housing. With this, the circuit board extends essentially normally to the longitudinal axis of the stator housing, which corresponds to the rotation axis of the rotor, which rotates in the inside of the stator. This arrangement ensures a small construction height of the whole terminal box, so that this may connect onto the axial end of the stator housing in a flat manner. Preferably, the circuit board is arranged near to the axial end of the terminal box which is distant to the stator housing, so that the electronic components on the circuit board are arranged essentially between the circuit board and the axial end of the stator housing. This has the advantage that the opposite side of the circuit board, which is distant to the electronic components, may be used for the connection of the operating- and/or display elements. The surface of the circuit board may be optimally utilized in this manner.

It is further preferable for the circuit board to be provided with plug contacts which are electrically conductively engaged with the electrical contacts of the connection element and/or the electrical contacts of the at least one connection plug. Thus, the free ends of the electrical leads or contacts of the connection element and/or connection plug, which are situated in the inside of the tubular housing part, come into electrical conductive engagement with the plug contacts on the circuit board. The free ends of the contacts extend thereto preferably parallel to the longitudinal axis of the stator housing, i.e., in the joining direction of the terminal box, when this terminal box is applied onto the stator housing. The plug contacts on the circuit board thereby are designed such that the electrical contacts of the connection element or connection plug come into engagement with the plug contacts in this direction. Thus, all components of the terminal box and in particular the terminal box and the stator housing, may be stuck together in the same joining direction, specifically in the longitudinal direction of the stator housing, wherein the electrical contacts automatically come into engagement with the plug contacts on the circuit board. A very simple assembly is made possible by this.

Preferably, the plug contacts and/or at least a part of the electrical or the electronic components are arranged on the surface of the circuit board which faces the stator housing.

Of the components arranged on the surface of the circuit board facing the stator housing, it is particularly preferable at least for the components with a large construction height to be arranged distributed in an annular manner such that a free space is admitted in a central region of the tubular housing part by these components, into which free space an axial end of a can arranged in the stator housing extends. That is, with this arrangement, the circuit board is preferably arranged near to the end of the tubular component which is distant to the stator housing, and the electronic components, proceeding from the circuit board, extend to the stator housing. Due to the fact that the components with a greater construction height are arranged in the peripheral region on the circuit board, a free space into which the axial end of the can may engage, remains in the central region of the tubular housing part, in front of the circuit board seen from the stator housing. This, in particular, is the region of the can in which a rotor bearing is arranged. A compact constructional shape with an as small as possible extension in the axial direction of the stator housing and of the attached terminal box is achieved in this manner.

The lid element, preferably at its side facing the inside of the tubular housing part, comprises connection contacts for the operating or display elements, wherein the connection elements are electrically conductively in engagement with corresponding connection contacts on the circuit board in the tubular housing part. The connection contacts between the lid element and the circuit board are preferably designed as plug contacts which may be brought into engagement with one another in a direction parallel to the longitudinal axis of the stator housing, i.e., in the joining direction of the tubular housing part and the lid element. It is thus possible to stick the lid element onto the terminal box in the direction of the longitudinal axis of the stator housing in a simple manner, whereby the connection contacts on the lid element are simultaneously brought into electrically conductive engagement with the connection contacts on the circuit board, which were previously arranged in the inside in the inside of the tubular housing part.

The lid element preferably comprises a carrier plate, which is at least partly covered by a cover plate on its surface distant to the tubular housing part, in which cover plate the surfaces of the operating elements and/or windows for the display elements are formed. The carrier plate thereby forms the actual lid which closes the tubular housing part on the axial side. The cover plate or the cover layer forms the terminating axial surface and contains the optical design of the operating- and display elements, in particular also lettering (description), type details, amongst others. Thereby, the cover plate may be designed in a partly transparent manner, in order to let light shine through from the display elements lying therebehind. The cover plate may, for example, be a cover film.

Further preferably, a circuit board is arranged on the surface of the lid element facing the tubular housing part, or between the carrier plate and the cover plate, on which circuit board the operating- and/or display elements are arranged, and preferably connection contacts are formed. This circuit board serves for the electrical connection of the operating and display elements, and may furthermore yet carry further electronic components which are particularly necessary for the operation of the operating and display elements. The circuit board may be arranged on the inner side of the lid element, i.e., in the inside of the terminal box, wherein then preferably recesses are provided in the carrier plate, through which light from the display elements on the circuit board may shine outwards, or operating elements may be actuated from the outside. The connection contacts are preferably arranged on the side of the circuit board which faces the tubular housing, and as described above, serve for engaging with connection contacts on the circuit board in the inside of the tubular housing part. The circuit board on the lid element extends preferably normally to the longitudinal direction of the stator housing, i.e., preferably parallel to the circuit board in the inside of the tubular housing part. Instead of directly electrically contacting the two circuit boards with one another, further electrical conductors for connection of both circuit boards may be arranged in the tubular housing part and/or the lid element Alternatively, it is possible for the circuit board to be arranged on the lid element on the outer side of the carrier element. For this, a deepening is formed in the carrier plate preferably on the outer side, i.e., the side distant to the inner space of the tubular housing part, into which recess the circuit board is inserted. The circuit board is then covered to the outside by the cover plate. In this case, preferably a recess is provided in the carrier element, through which the connection contacts may extend into the inside of the tubular housing part.

The tubular housing part is connected to the stator housing, preferably via locking elements. Alternatively or additionally, the tubular housing part is connected to the lid element via locking elements. This permits a simple assembly without special tools.

The tubular housing part preferably comprises a round, in particular a circular cross section. Thereby, the cross section particularly preferably corresponds to the cross section at the axial end of the stator housing so that here, a harmonious or smooth transition may be created. The round design furthermore permits a good sealing of the interfaces between the stator housing and the tubular housing part or between the tubular housing part and the lid element.

Seals are preferably arranged between the tubular housing part and the stator housing and/or between the tubular housing part and the lid element, the seals sealing the inner space of the terminal box to the outside. These seals are particularly preferably injected onto the tubular housing part and/or the lid element. This is effected preferably with two-component injection molding in a direct manner on manufacture of the housing part or of the lid element. Preferably, liquid silicone rubber LSR is applied as a material for the seals. Seals of liquid silicone rubber may be directly injected onto the plastic parts of the tubular housing part or of the lid element. Particularly preferably, the cover plate or the cover layer of the lid element or the operating elements on the lid element are likewise of the same material as a seal arranged on the lid element, preferably formed of liquid silicone rubber. This permits the cover layers or the operating elements to be formed on the lid element in one working procedure with the seal, which serves for sealing between the lid element and the stator housing. The cover plate covers the outer side of the lid element, preferably in a complete manner.

The invention further relates to a suitable method for manufacturing a pump assembly according to the preceding description, in particular for manufacturing a stator of a pump assembly. According to this method, the manufacture of the stator is effected in a manner such that an iron core of the stator is cast directly into the stator housing on casting the stator housing, i.e., preferably is incorporated into the stator housing when shaping this. Thereby, the casting-in of the iron core is effected before the windings are arranged on the iron core. The windings are only deposited onto the iron core, preferably wound directly onto the iron core, after casting the iron core into the stator housing. The stator housing, as described above, may preferably be designed of plastic, and is manufactured with the injection molding method. With this, it is very simply possible to cast the iron core into the plastic, i.e., to encase it completely or partly by the plastic. Thereby, winding carriers may be simultaneously cast onto or integrally formed on the iron core from the same material of which the stator housing also consists, onto which winding carriers the windings are deposited at a later stage. Particularly preferred designs, or further preferred method steps on manufacture of the stator or pump assembly are referred to in the following description.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a perspective view of the stator housing, seen from the side distant to the pump assembly;

FIG. 5 is a perspective view of the stator housing, seen from the side facing the pump housing;

FIG. 11 is an exploded view of the terminal box, seen from the side facing the stator housing;

FIG. 12 is an exploded view of the terminal box according to FIG. 11, seen from the outer side;

DETAILED DESCRIPTION OF THE INVENTION

Figure 1:
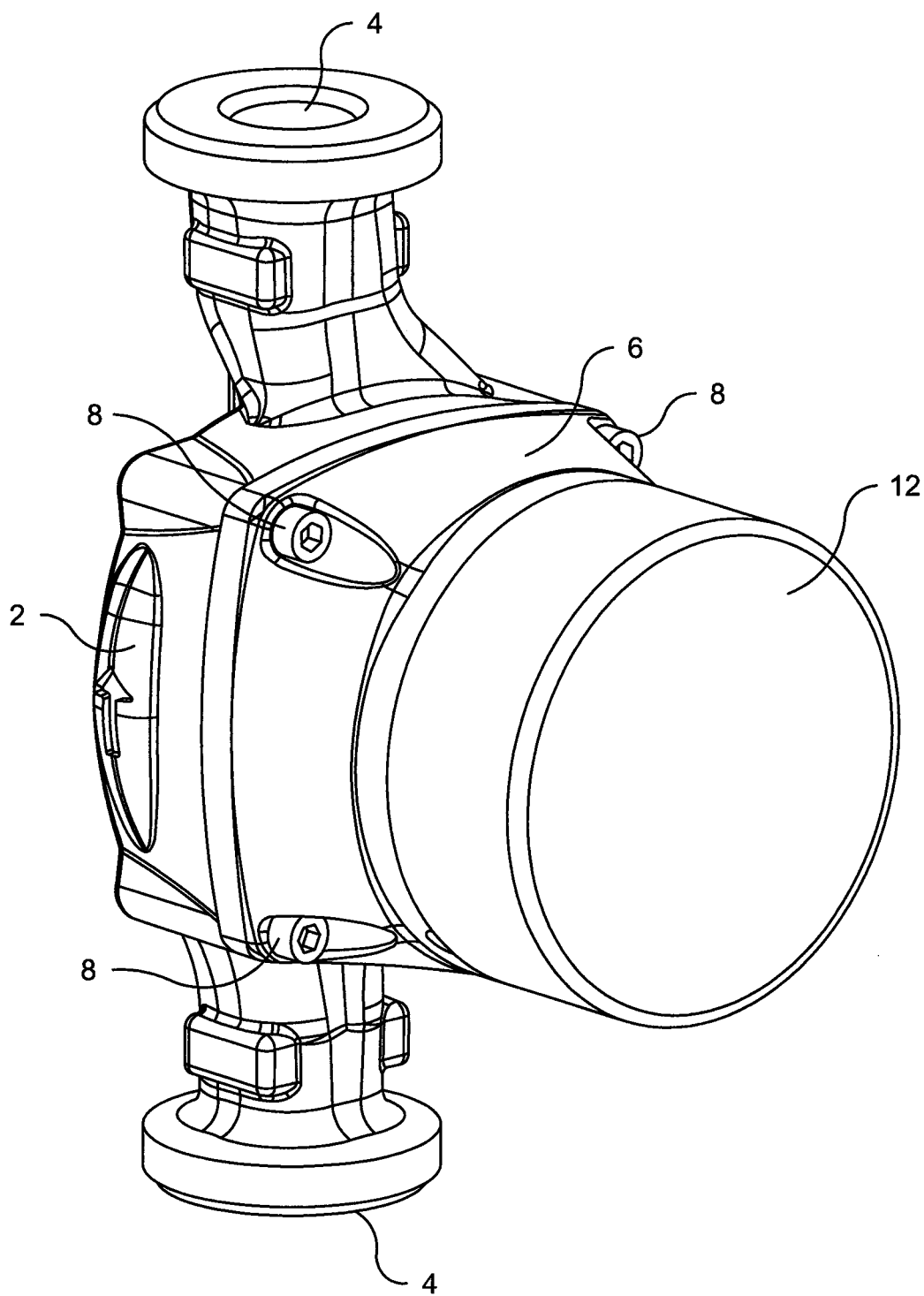
FIG. 1 is a perspective total view of a pump assembly according to a first embodiment of the invention.

The following described embodiment of a pump assembly is a heating circulation pump assembly with a wet-running electric motor. The pump assembly, which is represented in FIG. 1 in the assembled condition, comprises a pump housing 2 with the conduit connections 4 for the connection of the pump assembly to external pipework. In a known manner, the impeller of the pump is arranged in the pump housing 2, but is not shown in the attached figures. A stator housing 6, in which the electric drive, i.e., the electric motor of the pump assembly is arranged, is applied onto the pump housing. The stator housing 6 is screwed to the pump housing 2 via fastening means in the form of screws 8, which extend through through-holes 10 in the stator housing 6.

A terminal box 12 is attached on the axial end of the stator housing 6 which is distant to the pump housing 2. Thereby, the direction of the rotation axis of the pump assembly is to be understood as the axial direction, which extends centrally through the stator housing 6. The contact planes between the stator housing 6 and the pump housing 2, as well as between the stator housing 6 and the terminal box 12, extend essentially normally to this rotation and longitudinal axis X (see FIG. 2).

Figure 2:
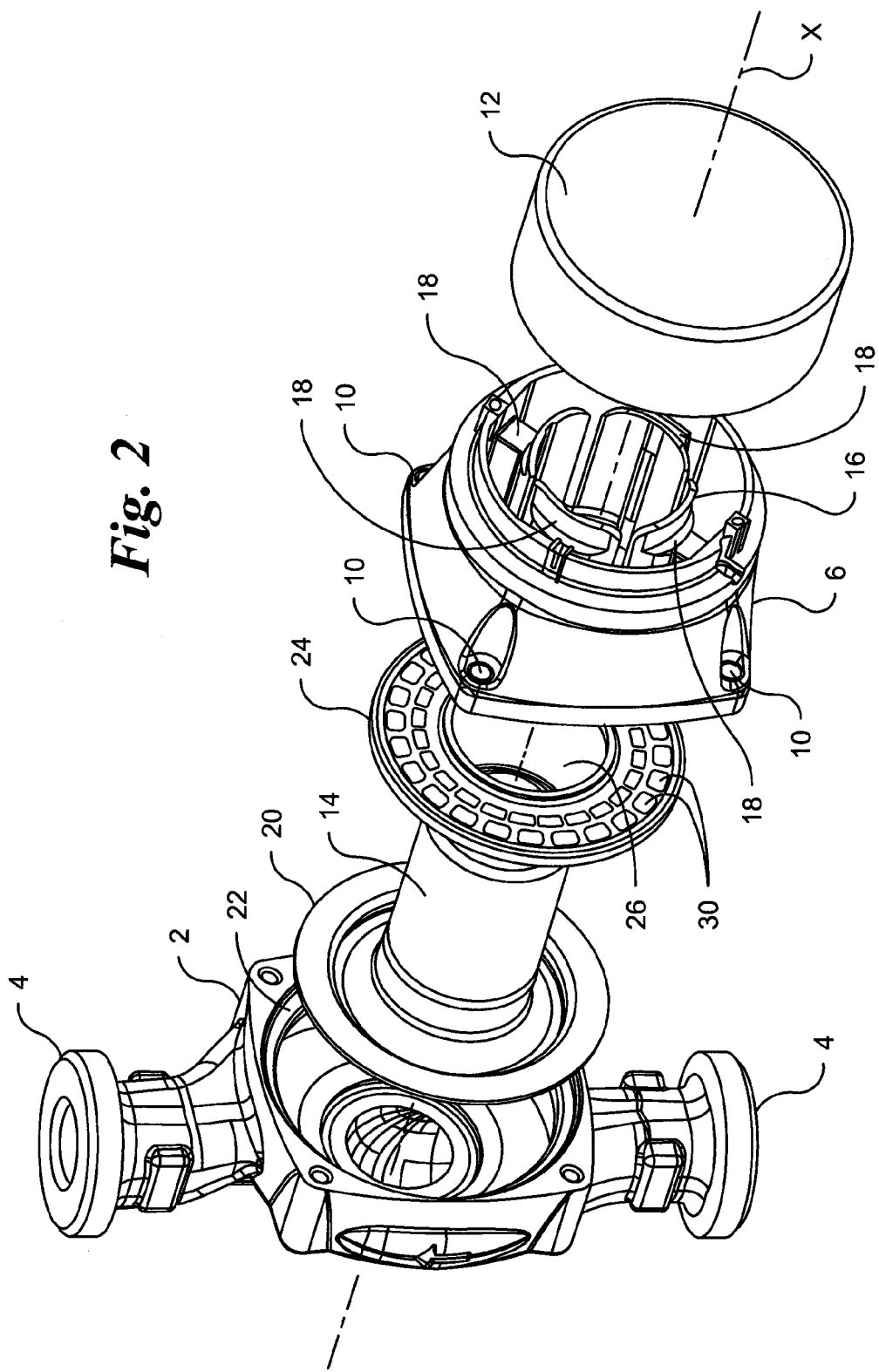
FIG. 2 is an exploded view of the pump assembly according to FIG. 1.

FIG. 2 in an exploded view, shows the essential details of the pump assembly. Apart from the pump housing 2 and the stator housing 6 as well as the terminal box 12, these are a can 14 as well as the iron core 16 of the stator, which is arranged in the inside of the stator housing 6.

Figure 3:
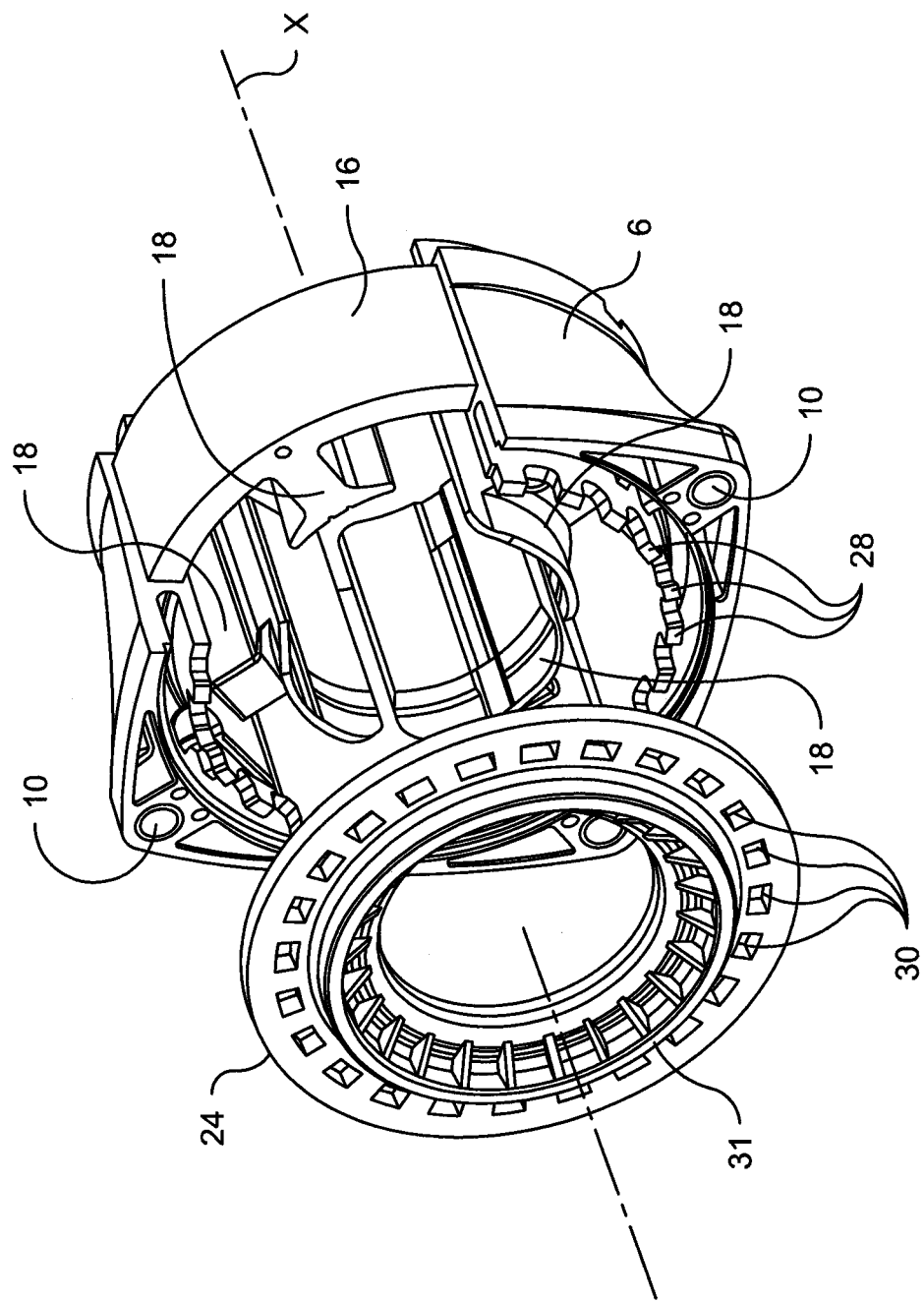
FIG. 3 is a partly sectioned exploded view of the stator housing.
Figure 6:
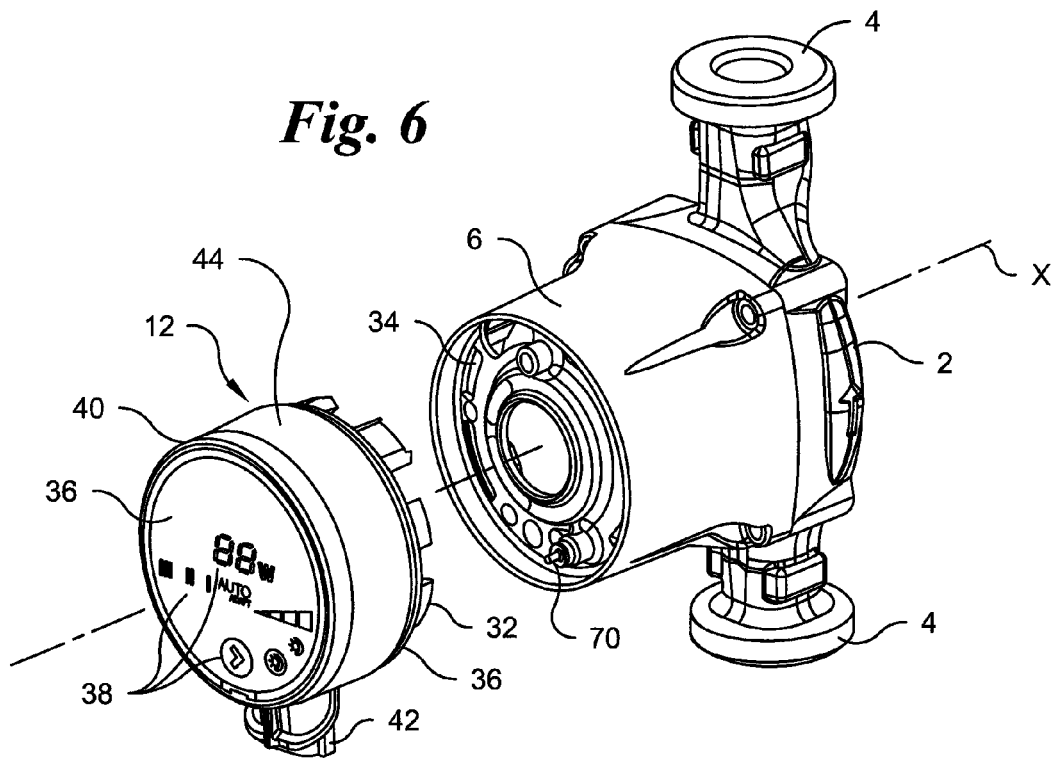
FIG. 6 is a pump assembly according to FIG. 1 with a removed terminal box.
Figure 7:
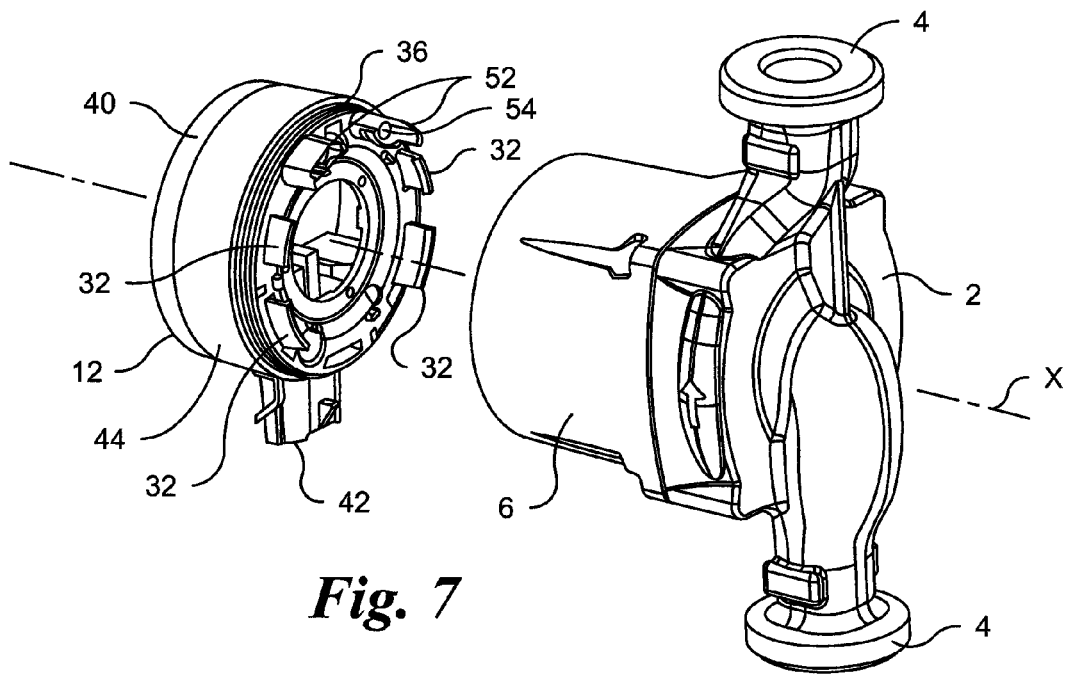
FIG. 7 is a pump assembly according to FIG. 6 with a view onto the side of the terminal box which faces the stator housing.

As may be particularly recognized in FIG. 3, in which the stator housing 6 is shown in a partly sectioned manner, the iron core 16 is designed as an essentially annular component with salient poles 18 extending radially inwards. Four such salient poles 18 are provided in the shown embodiment example. The iron core 16 with the salient poles 18 may be formed of layered (e.g., sheet metal) laminations in a known manner. The salient poles 18 may be designed as one piece with the surrounding ring of the iron core 16, but also may be put together from several components.

The iron core 16 is connected to the stator housing 6 by casting in. The stator housing 6 is designed as an injection molded part of plastic. The iron core 16 is applied into the tool on casting, so that the plastic of the stator housing 6 flows around the iron core 16, and the iron core 16 is cast into the stator housing. Thus, in particular, the circular outer ring of the iron core 16 lies within the peripheral wall of the stator housing 6 and is preferably completely enclosed by the plastic of the stator housing. An electrical insulation is simultaneously created in this manner.

A salient pole 18 is shown in a freely-lying manner in the broken open region in FIG. 3. The salient poles 18 however are likewise encased by the plastic material of the stator housing 6, as is recognized by the other three salient poles shown in FIG. 3, as well as those shown in FIGS. 2, 4 and 5, so that here the coil carriers are simultaneously formed on the salient poles 18 as one piece with the stator housing, the salient poles electrically insulating the coils to be arranged, with respect to the iron core 16. The coils (also referred to herein as "windings") are shown in FIGS. 4 and 5 designated as reference numeral 19. After casting the iron core 16 into the stator housing, the coils 19 are arranged on the iron core 16 on the salient poles 18. This, in particular, is effected in a manner such that the coils 19 are wound directly onto the salient poles 18 or the coil carriers formed there, in the inside of the stator housing 6. This is encouraged by the fact that the stator housing 6 is designed essentially tubular and open to the two axial ends, i.e., to the end side which faces the pump housing 2 and the terminal box 12, so that the salient poles 18 for winding the coils 19 are accessible from both axial sides. This accessibility, in particular, is improved by the fact that the can 14 at the axial end of the stator housing 6 facing the terminal box 12 is not mounted or fixed. The fixation of the can 14 is effected at the axial side of the terminal box 6 which faces the pump housing 2. For this, as may be recognized in FIG. 2, a radially outwardly projecting annular collar 20 is formed on the open end of the can 14 which faces the pump housing 2. The can 14 with the collar 20 is preferably formed as one piece, for example of rust-free stainless steel or plastic. The collar 20 forms an annular abutment surface which, with its side facing the pump housing 2, comes to bear on an annular bearing surface 22 on the pump housing 2. Thereby, a seal which is not shown may be arranged between the collar 20 and the bearing surface 22.

An intermediate ring 24 is provided for the fixation of the can 14. The intermediate ring 24 comprises a central circular recess 26, whose inner periphery comes to bear on the outer periphery of the can 14 and serves for the radial fixation of the can in the stator housing 6. The intermediate ring 24 is fixed on the stator housing with a positive fit. For this, the teeth 28, which are to be recognized in FIG. 3 arranged along an arc, extend in the axial direction, and which are formed in the stator housing, engage into corresponding recesses 30 in the intermediate ring. The intermediate ring may be fixed on the stator housing 6 in another manner than by the teeth 28 formed as one piece with the stator housing 6. On its side facing the pump housing 2, the intermediate ring 24 comprises an annular bearing surface 31 which comes to bear on the side of the collar 20 of the can 14 which faces the stator housing 6. Thus, the intermediate ring 24 with the bearing surface 31 presses against the collar 20 and thus the collar 20 onto the bearing surface 22 on the pump housing 2. The intermediate ring 24 is fixed by the engagement of the teeth 28 on the stator housing 6, so that this, when it is screwed to the pump housing 2 via the screws 8, presses the intermediate ring 24 against the collar 20 of the can 14. In this manner, the can, on fastening the stator housing 6 on the pump housing 2, is fixed or clamped between the stator housing 6 and the pump housing 2, and thus via the collar 20 is fixed at its end facing the pump housing 2, on the pump housing 2 and the stator housing 6 in the axial direction. Apart from the intermediate ring 24, the annular bearing surface 22 or its peripherally surrounding wall of the pump housing 2 may serve for the radial fixation of the can 14 in that the peripheral edge of the collar 20 comes to bear there.

The design of the intermediate ring 24 as a separate component has the advantage that the salient poles 18 in the stator 16 at first are freely accessible, so that the windings 19 may be easily introduced. Alter the incorporation of the windings 19, the intermediate ring 24 may then be attached to the stator housing 6, whereby the annular space in the stator housing 6, in which the windings 19 are arranged, are at least partly closed at the axial side facing the pump housing 2 by the intermediate ring 24. Alternatively, it is also possible not to design the intermediate ring 24 as a separate component, but as one piece with the stator housing 6, as is shown in FIG. 5. The design of the stator housing 6, which is shown in FIG. 5, is otherwise identical to that which has been previously described. Only here, the annular component, which corresponds to the intermediate ring 24 and forms a receiver region for the can, is cast as one piece with the stator housing 6.

The design of the terminal box 12 is now described in more detail by FIGS. 6 to 15.

The terminal box 12 is applied onto the axial face-end of the stator housing 6 which is distant to the pump housing 2. Thereby, the terminal box 12 is fixed on corresponding recesses 34 in the stator housing 6 via locking hooks 32, which project in the axial direction from the end facing the stator housing 6. A shoulder 36 is formed in the region of the outer periphery of the terminal box 12, and this shoulder engages into the inside of the stator housing 6, and a seal is arranged in its region. The seal may be injection molded directly onto the terminal box 12, or it may be the case of a seal to be inserted, for example an O-ring. Since with the described pump assembly, the gap to be sealed between the pump housing 2 and the stator housing 6 as well as the gap between the stator housing and the terminal box 12 are designed in the manner of an annulus, a good covering is possible here. The outer periphery of the terminal box 12 corresponds to the outer periphery of the stator housing 6 at its end facing the terminal box, so that with an attached terminal box 12, there is a smooth transition from the stator housing 6 to the terminal box 12, without shoulders.

Operating and display elements 38 as well as optional type details are incorporated on the axial end-face 36 of the terminal box 12 distant to the stator housing 6. Thereby, the axial-side end-face 36 is formed by a cover element or lid 40, which closes the terminal box 12 on the axial side. Furthermore, a connection plug 42 as a connection element is formed as one piece with the housing wall of the terminal box 12 peripherally on the terminal box 12.

Figure 8:
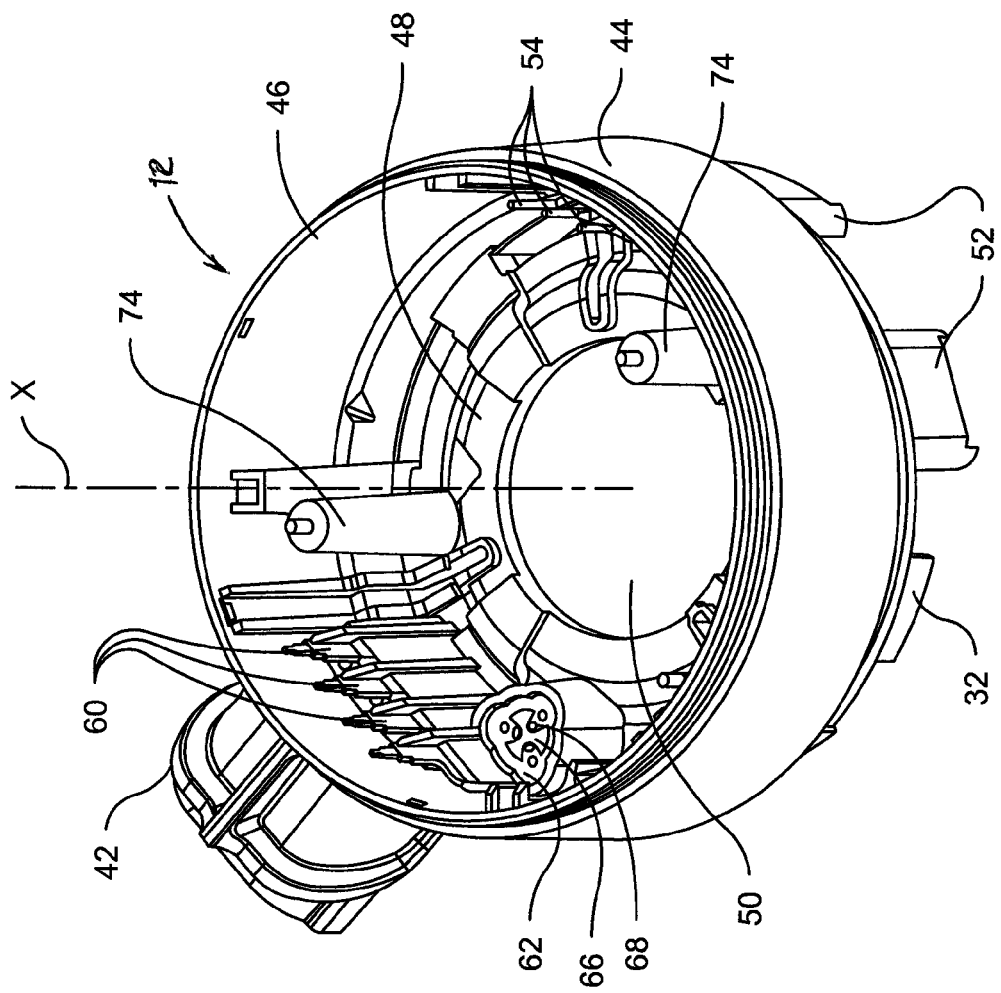
FIG. 8 is a perspective view of a housing part of the terminal box.
Figure 10:
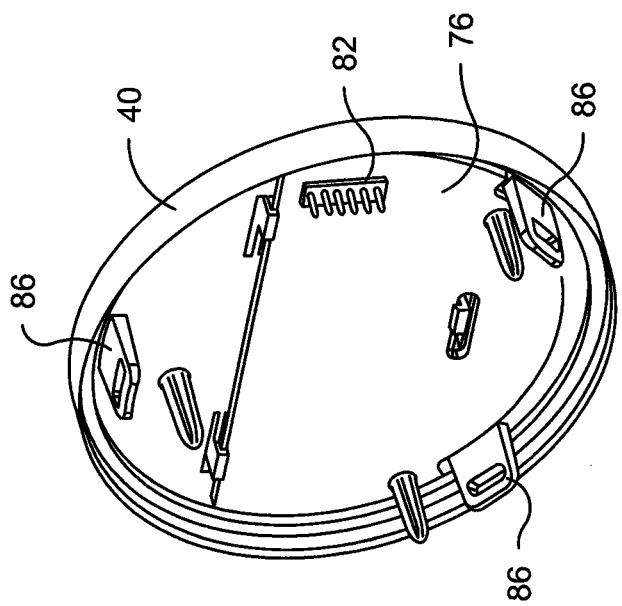
FIG. 10 is a view of the terminal box lid seen from the inner side.
Figure 9:
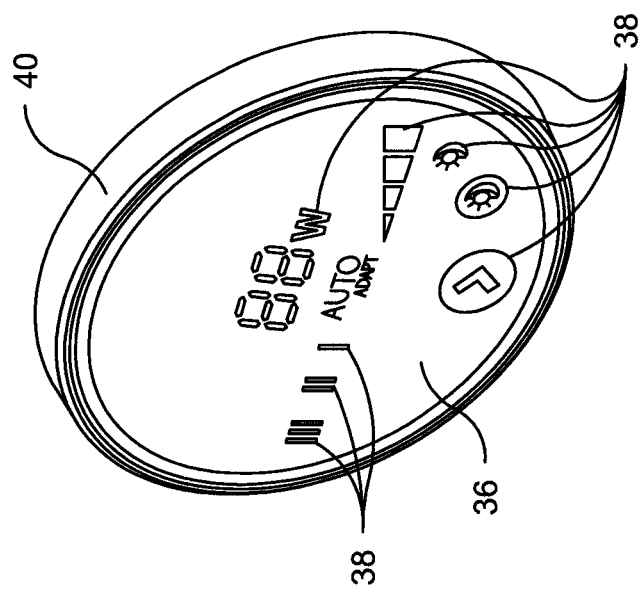
FIG. 9 is a view of the terminal box lid seen from the outside.
Figure 13:
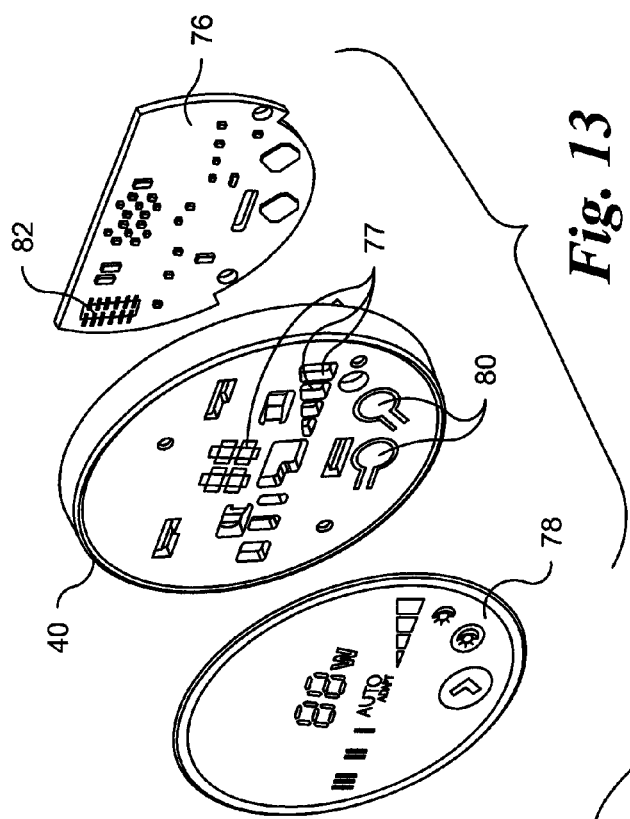
FIG. 13 is an exploded view of the terminal box lid, seen from the outer side.
Figure 14:
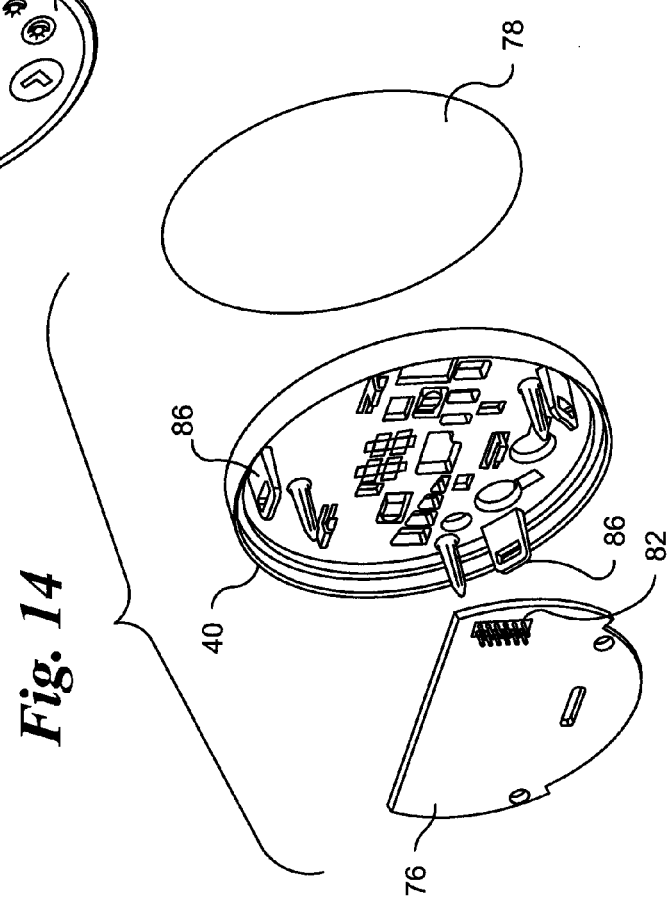
FIG. 14 is an exploded view of the terminal box lid, seen from the inner side.

The central component of the terminal box 12 is the tubular housing part 44 which is shown in FIG. 8 as an individual part. The tubular housing part 44 of the terminal box 12 is an integral component of plastic, which is manufactured in the injection molding method. The connection plug 42, proceeding from the peripheral wall of the housing part 44, extends radially outwards and is formed as one piece with the housing part 44. The housing part 44 at the end distant to the stator housing 6 is formed in a completely open manner, i.e. has a circular opening 46 which is closed by the lid 40. A radially inwardly directed collar 48 with a central circular opening 50 is formed on the opposite end facing the stator housing 6, on the tubular housing part 44. The can 14 with its axial end, which is distant to the pump housing 2, engages into this circular opening 50.

Furthermore, locking hooks 32 as well as connection plugs 52 are formed on the axial end on which the collar 48 is formed, and these likewise extend in the axial direction onto the stator housing 6, and engage into this in the assembled condition. The connection plug 52 serves for the connection of the coils or windings in the stator housing and comes into engagement with corresponding contacts or plugs in the stator housing 6 when the terminal box 12 is stuck onto the stator housing 6. The connection plugs 52 comprise electrical contacts or conductors 54, which are cast into the plastic of the component 44. For this, metal strips, preferably punched sheet metal parts are inserted into the tool before injection molding the component 44, so that the conductors 54 are then cast into the tool. Alternatively, the conductors 54 are also designed such that they may be applied or inserted into the component 44 at a later stage. The conductors 54 represent the connection between the coils of the stator and a circuit board 56 arranged in the terminal box, on which circuit board the control and regulation electronics for operation of the pump assembly, for example also a frequency converter, are arranged. The conductors 54 engage into corresponding plug or connection contacts 58 on the circuit board 56 (see FIGS. 11 and 12) for this connection.

Accordingly, the connection plug 42 also comprises electrical contacts or conductors 60 and 62, of which the conductor 62 is designed as a ground contact. The conductors 60 and 62 are cast directly into the plastic of the component 44 in the manner described previously, so that one may do away with an additional sealing on the connection plug 42 to the inner space of the component 44. Alternatively, it is also possible the insert the conductors 60 and 62 as separate components into corresponding openings in the connection plug 42 at a later stage, wherein then, as the case may be, one must provide a separate seal. The conductors 60 extend in the inside of the component 44, as also the conductors 54, with their free axial ends in the axial direction X, and serve for the electrical connection of the circuit board 56, on which suitable plug- and connection contacts 64 are formed, into which the conductors 60 may engage with their free ends (see FIG. 12).

The ground contact 62 is designed in a manner such that its free end distant to the connection plug 42 is angled in a manner such that it extends in a plane normal to the longitudinal axis X. The ground contact in this region is designed such that it comprises an opening 66 which is surrounded by three surrounding tongues 68. On assembly of the terminal box, a ground contact in the form of a contact pin 70 which is arranged in the stator or stator housing 6 and likewise extends in the axial direction, enters this opening. Thereby, the tongues 68 come into contact with the peripheral wall of the contact pin 70. The tongues 68 thereby are deflected out in a resilient manner, so that a secure bearing and a reliable contact between the ground contact 62 and the contact pin 70 is given.

As is represented in FIGS. 11 and 12, the circuit board 56 with the electronic components 72 arranged thereon is inserted into the housing part 44. The circuit board thereby is inserted through the opening 46, which is closed by the lid 40, into the inner space of the terminal box 12. The circuit board comes to lie on the column-like projections 74, which are likewise designed as one piece with the housing part 44 (see FIG. 8). These column-like projections 74 keep the circuit board spaced from the collar 48, so that the electronic components on the circuit board are arranged between the circuit board and the collar 48, in the inside of the terminal box. That is, the circuit board 56 in its installed condition bears on the axial end of the terminal box facing the lid 40. Accordingly, the free ends of the electric conductors 54 and 60 are placed in the inside of the component 44, such that they engage in the corresponding position into the connection contacts 58 and 64 on the circuit board. The electronic components 72 are distributed on the circuit board such that those components with a large construction height are arranged in the peripheral region, so that they do not project into the space of the terminal box 12 situated axially above the opening 50. This space thus remains free, so that here, the axial end of the can 14 may project into the terminal box.

A further circuit board 76 is arranged in the cover element or lid shown in more detail in the FIGS. 9, 10 and 13 to 15, on which circuit board the operating and display elements 38, as well as components necessary for their operation, are arranged. The wiring of the operating and display elements is formed on this circuit board 76. The operating and display elements 38 may, for example, contain LED's which are assembled with SMD-technology. The circuit board 76 is fastened on the inner side of the lid, preferably by locking elements, with the examples shown in FIGS. 9 to 14. Openings 77 are provided in the lid 40 for the display elements.

Alternatively, the lid 40 may also be designed in a transparent manner. The lid 40 at its outer side, i.e., its side distant to the housing part 44, is covered by a cover film 78 which forms the actual end-face 36. This cover film closes the openings 77 and comprises the necessary lettering. Furthermore, spring elements 80 for the actuation elements are formed in the lid 40 as one piece. The cover film 78 is designed suitably elastic, so that the spring elements may be pressed through the cover film 78. The spring elements 80 then press onto suitable switch or contact elements on the circuit board 76. Electrical connection contacts in the form of axially projecting pins are formed on the circuit board 76 for the electrical connection of the circuit board 76 to the circuit board 56. The connection contacts 82 are in electrically conducting engagement with corresponding connection contacts or connection sockets 84 on the circuit board 56. This permits the lid 40 to be able to be simply stuck onto the component 40 after the insertion of the circuit board 56 into the component 40. The connection contacts 82 and 84 between the circuit board 76 previously assembled in the lid, and the circuit board 56 then come into electrically conductive engagement. This thus permits a very simple assembly of the terminal box since all components are stuck together in the same axial direction X.

The fastening of the lid 40 on the housing part 44 is effected in a simple manner via locking elements 86. Thus, a simple assembly without screws or likewise is possible.

Figure 15:
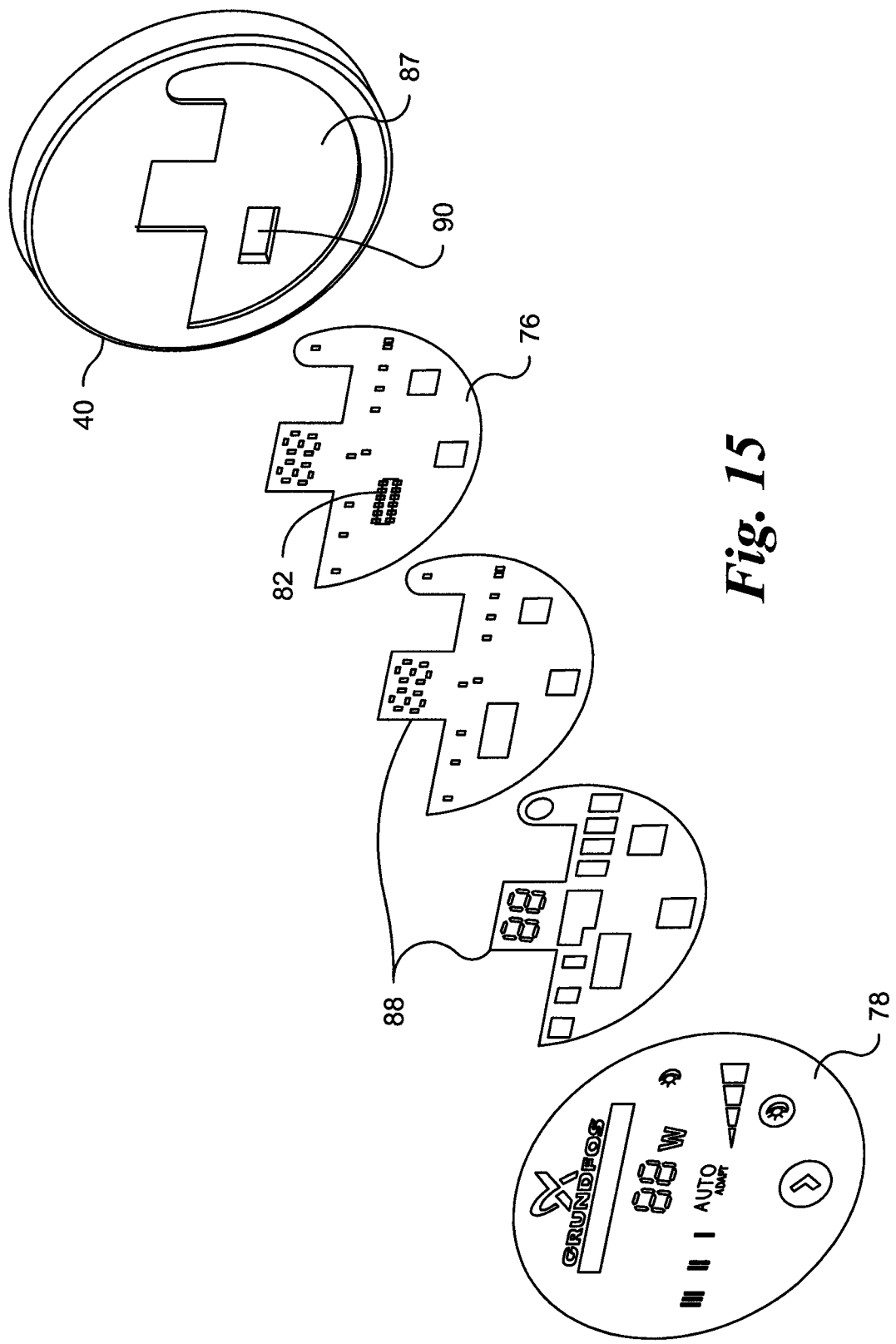
FIG. 15 is an exploded view of a terminal box lid according to a second embodiment of the invention.

FIG. 15 shows an alternative embodiment of the lid with which the circuit board 76 is not arranged on the inner side of the lid 40, but in a recess 87 on the outer side of the lid 40. Intermediate layers 88 yet lie over the circuit board 76. The recess is then closed or covered to the outside by the cover film 78. A recess 90 is provided for the connection contacts 82 on the circuit board 76, through which recess the connection contacts 82 extend to the inner side of the lid 40, in order to be able to come into engagement with connection contacts 84 of a circuit board 56.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A pump assembly having an electric can motor, the assembly comprising:
 an exterior housing assembly comprising a pump housing connected to a stator housing, the exterior housing assembly having an exterior surface, the pump housing forming a part of the exterior surface of the exterior housing assembly and directing fluid to and from a pump impeller rotatably disposed in a can;
 an iron stator core having a plurality of salient poles disposed around the can, the salient poles being oriented to extend toward the center of the can, wherein the stator housing is an integrally formed component which:
 (i) forms a part of the exterior surface of the exterior housing assembly,
 (ii) forms an encasement which completely encases the iron stator core, and
 (iii) forms coil carriers on the salient poles; and
 windings deposited onto the salient poles after casting the iron stator core into the stator housing, the windings being exposed to the can located in the center of the stator housing.

2. The pump assembly according to claim 1, wherein the stator housing is manufactured of plastic as an injection molded part.

3. The pump assembly according to claim 1, wherein the stator housing is designed in a tubular manner with openings at a first axial end and a second axial end, wherein the stator housing at the first axial end is connected to the pump housing, and wherein the second axial end is closed by a lid or terminal box.

4. The pump assembly according to claim 3, wherein at least one of operating and display elements are arranged on the lid or terminal box on an axial side thereof.

5. The pump assembly according to claim 1, wherein the electric can motor is designed as a wet-running electric motor.

6. The pump assembly according to claim 5, wherein one of the first and second axial ends of the stator housing faces the pump housing, and the can, in a region of the one of the first and second axial ends of the stator housing facing the pump housing, is fixed in at least an axial direction.

7. The pump assembly according to claim 6, wherein the can at its axial end facing the pump housing comprises an outwardly projecting collar which is fixed between the pump housing and the stator housing.

8. The pump assembly according to claim 7, wherein the can with its collar bears directly, in at least an axial direction, on a receiver region at the one of the first and second axial ends of the stator housing facing the pump housing.

9. The pump assembly according to claim 7, wherein the can with its collar bears directly, in at least the axial direction, on an intermediate ring arranged inside of the stator housing at the one of the first and second axial ends of the stator housing facing the pump housing.

10. The pump assembly according to claim 1, wherein the first axial end of the stator housing faces the pump housing and a terminal box comprising a tubular housing part is: arranged on the stator housing on the second axial end of the stator housing, wherein the tubular housing part with a first axial end is applied onto the second axial end of the stator housing, an opposite, second axial end of the tubular housing part (44) is closed by at least one lid element, into which at least one of operating and display elements are integrated, and an electrical connection element is arranged on the tubular housing part on its outer periphery.

11. The pump assembly according to claim 6, wherein the can, in the region of the one of the first and second axial ends of the stator housing facing the pump housing, is fixed in a radial direction.

12. The pump assembly according to claim 8, wherein the can with its collar also bears directly, in a radial direction, on the receiver region at the one of the first and second axial ends of the stator housing facing the pump housing.

13. The pump assembly according to claim 9, wherein the intermediate ring is engaged with the stator housing with at least one of a non-positive fit and a positive fit.

14. The pump assembly according to claim 9, wherein the can with its collar also bears directly, in a radial direction, on the intermediate ring.

* * * * *